US009797731B2

United States Patent
High et al.

(10) Patent No.: US 9,797,731 B2
(45) Date of Patent: Oct. 24, 2017

(54) CONSOLIDATING AND TRANSFORMING OBJECT-DESCRIPTIVE INPUT DATA TO DISTRIBUTED RENDERED LOCATION DATA

(71) Applicant: Wal-Mart Stores, Inc., Bentonville, AR (US)

(72) Inventors: Donald High, Noel, MO (US); Michael Atchley, Springdale, AR (US); Eric Welch, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 34 days.

(21) Appl. No.: 14/813,225

(22) Filed: Jul. 30, 2015

(65) Prior Publication Data
US 2016/0033287 A1 Feb. 4, 2016

Related U.S. Application Data

(60) Provisional application No. 62/031,328, filed on Jul. 31, 2014.

(51) Int. Cl.
*G01S 19/09* (2010.01)
*G01C 21/20* (2006.01)
(Continued)

(52) U.S. Cl.
CPC ............ *G01C 21/206* (2013.01); *G06Q 10/08* (2013.01); *H04W 4/04* (2013.01)

(58) Field of Classification Search
CPC ....... H04W 4/02; H04W 4/206; H04W 4/008; H04W 4/021; H04W 4/028; H04W 4/04;
(Continued)

(56) References Cited

U.S. PATENT DOCUMENTS 6,386,450 B1 * 5/2002 Ogasawara ........ G06K 17/0022
235/380
6,895,330 B2 * 5/2005 Cato ...................... G01C 21/20
235/375

(Continued)

FOREIGN PATENT DOCUMENTS

| CA | 2415031 A1 | 1/2002 |
| EP | 2463818 A1 | 6/2012 |
| WO | 01/27837 A2 | 4/2001 |

OTHER PUBLICATIONS

"The Connected Consumer: Using Mobility to Enrich the Shopping Experience," A Frost & Sullivan White Paper, 10 pages. Downloaded from http://public.dhe.ibm.com/common/ssi/ecn/en/rew03015usen/rew03015usen.pdf, last accessed Apr. 9, 2014.
(Continued)

*Primary Examiner* — Nicholas Kiswanto
*Assistant Examiner* — Kenny A Taveras
(74) *Attorney, Agent, or Firm* — McCarter & English, LLP; David R. Burns (57) ABSTRACT

Systems and methods are provided for consolidating and transforming object-descriptive input data to distributed rendered location data. The systems and methods are configured to receive object-descriptive input data from a plurality of input devices, consolidate the object-descriptive input data and correlate it with a plurality of physical objects, determine first and second subsets of the plurality of physical objects based on a proximity of each of the physical objects to each of a plurality of user devices, construct user device-specific graphical maps each indicating a route to each object in a subset, and instruct each user device to display a graphical map constructed therefor.

19 Claims, 7 Drawing Sheets

(51) Int. Cl.
*H04W 4/04* (2009.01)
*G06Q 10/08* (2012.01)

(58) Field of Classification Search
CPC ....... H04W 12/06; H04W 4/023; H04W 4/20;
H04W 4/18; H04W 64/00; H04W 4/005;
H04W 4/026; H04W 4/027; H04W 4/043;
H04W 4/08; H04W 64/006; H04W 8/205;
G01C 21/34; G01C 21/3632; G01C
21/00; G01C 21/206; G01C 21/26; G01C
21/30; G01C 21/367; G01C 21/005;
G01C 21/3446; G01C 21/3453; G01C
21/3697
See application file for complete search history.

(56) References Cited

U.S. PATENT DOCUMENTS

| | | | | |
|---|---|---|---|---|
| 8,543,463 B2* | 9/2013 | Zakas | ............... | G06Q 30/0603 |
| | | | | 705/26.1 |
| 8,606,642 B2* | 12/2013 | Siounis | ................ | G06Q 30/00 |
| | | | | 705/26.1 |
| 9,230,272 B1* | 1/2016 | Eramian | ............ | G06Q 30/0281 |
| 9,595,062 B2* | 3/2017 | Goulert | ............. | G06Q 30/0633 |
| 2003/0158796 A1* | 8/2003 | Balent | ................ | G06Q 30/0633 |
| | | | | 705/28 |
| 2006/0059049 A1* | 3/2006 | Morris | ............... | G06Q 30/0601 |
| | | | | 705/26.1 |
| 2009/0179753 A1* | 7/2009 | Bonner | ................... | G01S 5/14 |
| | | | | 340/539.32 |
| 2009/0224977 A1* | 9/2009 | Bonner | .................... | G01S 5/02 |
| | | | | 342/378 |
| 2010/0049594 A1* | 2/2010 | Bonner | ................. | H04L 67/12 |
| | | | | 705/26.1 |
| 2010/0057541 A1* | 3/2010 | Bonner | ............ | G06Q 30/0261 |
| | | | | 705/26.1 |
| 2011/0106624 A1* | 5/2011 | Bonner | ............ | G06Q 30/0261 |
| | | | | 705/14.58 |
| 2011/0137747 A1* | 6/2011 | Sapin Bodeman | .... | G06Q 30/06 |
| | | | | 705/26.35 |
| 2011/0225068 A1* | 9/2011 | Figueroa | ........... | G06F 17/30241 |
| | | | | 705/27.1 |
| 2012/0080517 A1* | 4/2012 | Braunstein | .............. | G07F 9/026 |
| | | | | 235/379 |
| 2012/0214515 A1* | 8/2012 | Davis | .................... | H04W 4/023 |
| | | | | 455/456.3 |
| 2012/0296770 A1* | 11/2012 | Lin | .................... | G06Q 30/0601 |
| | | | | 705/26.8 |
| 2013/0046648 A1* | 2/2013 | Calman | ................ | G06Q 30/08 |
| | | | | 705/26.3 |
| 2013/0103608 A1* | 4/2013 | Scipioni | ................ | G06Q 30/02 |
| | | | | 705/346 |
| 2013/0198039 A1* | 8/2013 | Sridharan | ............ | G06Q 30/016 |
| | | | | 705/26.44 |
| 2013/0203439 A1* | 8/2013 | Lifshitz | ................ | H04W 64/00 |
| | | | | 455/456.2 |
| 2014/0019300 A1* | 1/2014 | Sinclair | .............. | G06Q 30/0639 |
| | | | | 705/26.9 |
| 2014/0172640 A1* | 6/2014 | Argue | ................ | G06Q 30/0641 |
| | | | | 705/26.61 |
| 2014/0207615 A1* | 7/2014 | Li | ....................... | G06Q 30/0623 |
| | | | | 705/26.61 |
| 2015/0039461 A1* | 2/2015 | Gadre | ................ | G06Q 30/0639 |
| | | | | 705/26.7 |
| 2015/0058157 A1* | 2/2015 | Tamir | ..................... | G06Q 90/20 |
| | | | | 705/26.7 |
| 2015/0106183 A1* | 4/2015 | McEvilly | .............. | H04W 4/025 |
| | | | | 705/14.25 |
| 2015/0134429 A1* | 5/2015 | Katakwar | .......... | G06Q 30/0207 |
| | | | | 705/14.1 |
| 2015/0142591 A1* | 5/2015 | High | .................. | G06Q 30/0613 |
| | | | | 705/21 |
| 2015/0165327 A1* | 6/2015 | Chu | ......................... | A63F 13/79 |
| | | | | 463/7 |
| 2015/0204685 A1* | 7/2015 | Gearhart | ................ | G01C 21/36 |
| | | | | 701/533 |
| 2016/0033287 A1* | 2/2016 | High | .................. | G01C 21/206 |
| | | | | 701/522 |
| 2016/0063609 A1* | 3/2016 | Argue | ................ | G06Q 30/0639 |
| | | | | 705/16 |
| 2016/0110679 A1* | 4/2016 | Putnam | ................ | G06Q 10/087 |
| | | | | 705/28 |
| 2016/0171472 A1* | 6/2016 | Pugh | ..................... | G06Q 20/204 |
| | | | | 705/14.23 |
| 2016/0171592 A1* | 6/2016 | Pugh | ................. | G06F 17/30386 |
| | | | | 705/26.81 |
| 2016/0203455 A1* | 7/2016 | Hicks | ................... | G07G 1/0081 |
| | | | | 705/75 |
| 2016/0225045 A1* | 8/2016 | Cumberland | ...... | G06Q 30/0605 |
| 2016/0275590 A1* | 9/2016 | Todasco | ............... | G06Q 30/016 |
| 2017/0098235 A1* | 4/2017 | Zilkha | ................ | G06Q 30/0239 |

OTHER PUBLICATIONS

"Mobile in Retail: Getting your Retail Environmental Ready for Mobile," A GS1 MobileCom White Paper, 2010, 34 pages. Downloaded from http://www.gs1.org/docs/mobile/mobil_in_retail.pdf, last accessed Apr. 9, 2014.

"Mobilizing the Multichannel Shopping Experience: 5 Ways Retailers can Build a Relevant mCommerce Relationship With Their Most Valuable Customers Both In-Store and Online," PowerPoint presentation, retail TouchPoints, 2010, 15 pages.

"Mobilizing the Retail Shopping Experience," Maxymiser Study, Aug. 2013, 10 pages.

Reddy, A. et al., "Mobilizing the Enterprise," Future of Work, Cognizant Business Consulting, Feb. 2012, pp. 1-19.

\* cited by examiner

CONSOLIDATING AND TRANSFORMING OBJECT-DESCRIPTIVE INPUT DATA TO DISTRIBUTED RENDERED LOCATION DATA

CROSS-REFERENCE TO RELATED APPLICATIONS

This application claims priority to and benefit of U.S. Provisional Patent Application No. 62/031,328, filed Jul. 31, 2014, the disclosure of which is incorporated herein by reference in its entirety.

BACKGROUND

Conventionally, item lists for partial acquisition by each of a plurality of resources are simply divided at random without consideration for acquisition efficiency or routing guidance regarding item location. However, dividing lists can be arbitrary and result in a loss of the time savings that dividing the lists is supposed to create. Users may not take into account the positions of objects within a geographic location (e.g., within a warehouse or a store) when dividing a list. Further, simply dividing the list to give each user the same number of items may result in some users traversing too far to find the items, some users having more heavy and/or otherwise burdensome items on that user's individual list. Such conventional systems therefore result in costly systemic delays and inefficiencies.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, item lists for partial acquisition by each of a plurality of resources are simply divided at random without consideration for acquisition efficiency or routing guidance regarding item location. Such systems result in costly systemic delays and inefficiencies.

Figure 1:
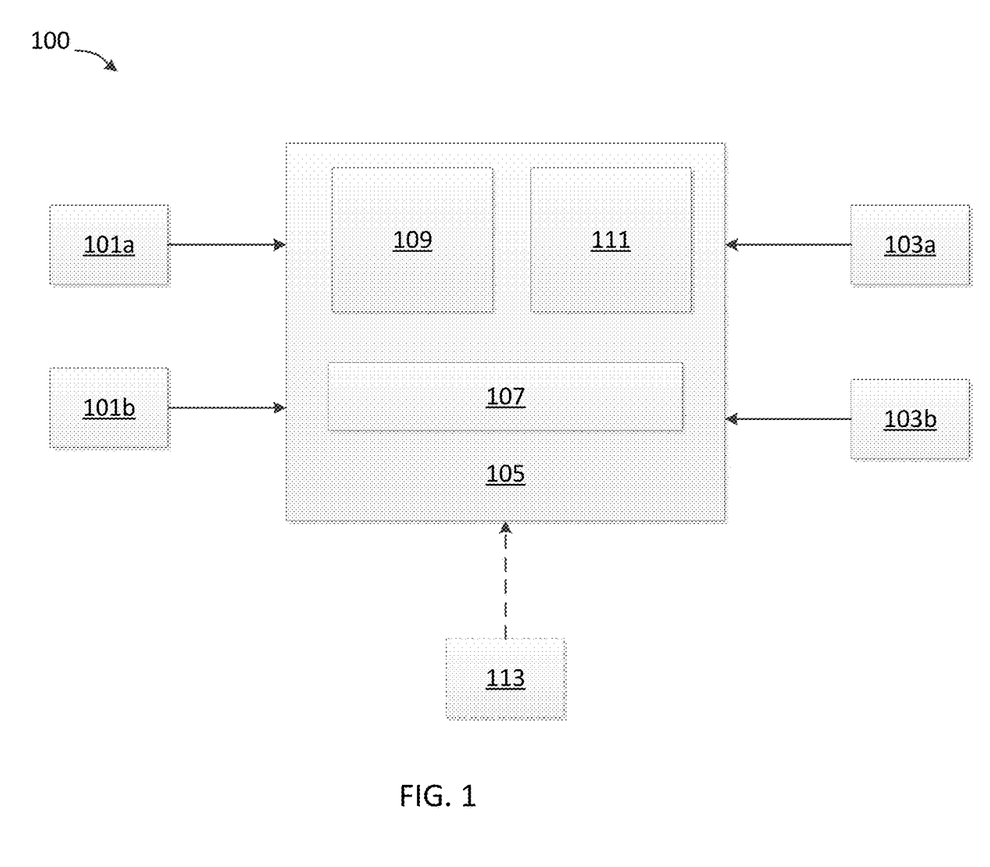
FIG. 1 is a block diagram showing a system for consolidating and transforming object descriptive input data to distributed rendered location data in accordance with various embodiments.

Methods and systems are provided herein for consolidating and transforming object-descriptive input data to distributed rendered location data. Referring now to FIG. 1, a system 100 for consolidating and transforming object-descriptive input data to distributed rendered location data includes a first input device 101a, a second input device 101b, a first user device 103a, and a second user device 103b in electronic communication with a datacenter 105 having a memory 107 and a processor 109 and a communication device 111. The system also includes an optional object location database 113. In accordance with various embodiments, the datacenter 105 receives, via the communication device 111, first and second quantities of object-descriptive input data from the first and second input devices 101a, 101b. The datacenter 105, via the memory 107 and the processor 109, consolidates the received object-descriptive input data into a consolidated quantity of object descriptive input data and correlates the consolidated quantity of object-descriptive input data with a plurality of physical objects (not shown). The datacenter 105 is also configured to receive a geographical location of each user device 103a, 103b via the communication device 111. The datacenter 105 can also retrieve, from the object location database 113, a closest proximity location of each of the plurality of physical objects to each user device 103a, 103b. The datacenter 105, via the memory 107 and the processor 109, can also analyze the closest proximity information, and generate first and second lists comprising first and second subsets of the plurality of physical objects. The first and second lists can be selected, in accordance with various embodiments, to minimize a total distance required to be traversed for the first and second user devices 103a, 103b to, in combination, reach each of the plurality of physical objects. In accordance with various embodiments, the first and second lists can be selected to minimize a time and/or distance required for the first and second user devices 103a, 103b to, in combination, reach each of the plurality of physical objects. The datacenter 105, via the memory 107 and the processor 109, can programmatically construct first and second graphical route maps illustrating a route from the geographical location(s) of the first and second user devices 103a, 103b for transmittal to and rendered display by the user devices 103a, 103b.

Input devices 101a, 101b can include, for example, but not limited to, any of a laptop computer, a desktop computer, a kiosk, a point of sale (PUS) terminal, a mobile device (e.g., a smartphone, tablet, smartwatch, mobile phone), a touch screen display, or any other suitable device for permitting a user to input a quantity of object-descriptive input data (e.g., physical dimensions, name, brand, functionality, color, barcodes, RFID codes, other optically readable codes, or other data descriptive of one or more objects). In accordance with various embodiments, peripheral features of the input devices 101a, 101b can be used to gather the object-descriptive input data. For example, a camera feature of a smartphone or a scanning device of a PUS can be used to read an optical code associated with an object.

User devices 103a, 103b can include, for example, but not limited to, any of a laptop computer, a desktop computer, a kiosk, a point of sale (POS) terminal, a mobile device (e.g., a smartphone, a tablet, a smartwatch, a mobile phone), a touch screen display, a GPS system, or any other suitable device for identifying a geographical location of each user device 103a, 103b and displaying a rendered graphical map. In accordance with various embodiments, the user devices 103*a*, 103*b* can be used to continuously update progress along the assigned route by geographical location updates, scanning (e.g., via an optical scanner or a camera feature) the objects upon retrieval/acquisition, manually identifying retrieved/acquired objects, etc.

While the input devices 101*a*, 101*b* and user devices 103*a*, 103*b* have been illustrated as separate and distinct devices, in exemplary embodiments of the present disclosure the input devices 101*a*, 101*b* can also be user devices and/or the user devices 103*a*, 103*b* can also be input devices.

The datacenter 105 can include, for example, inventory management systems, servers, individual computing or mobile devices, data centers, cloud computers, or combinations thereof. The datacenter 105 can include processor 109, a memory 107, and a communication device ill. Processor 109, in accordance with various embodiments can include, for example, but not limited to, a microchip, a processor, a microprocessor, a special purpose processor, an application specific integrated circuit, a microcontroller, a field programmable gate array, or any other suitable processor. Memory 107, in accordance with various embodiments can include, for example, but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof. Communication device 111, in accordance with various embodiments can include, for example, but not limited to, a built-in network adapter (e.g., built-in to the datacenter 105), network interface card, PCMCIA network card, card bus network adapter, wireless network adapter, USB network adapter, modem or any other device suitable for interfacing with any type of network capable of communication and performing the operations described herein.

Figure 2:
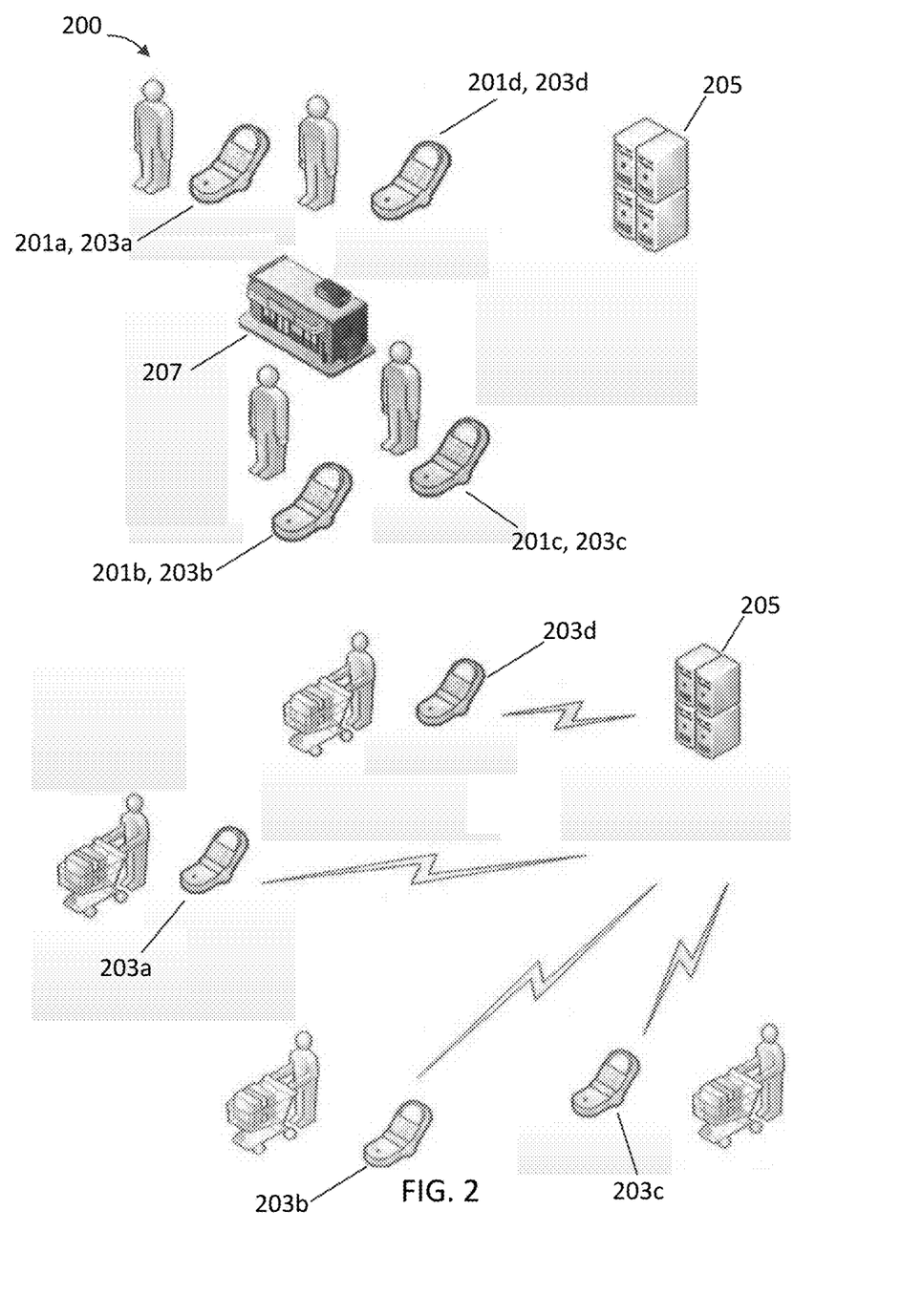
FIG. 2 is a functional flow diagram showing operation of a system for consolidating and transforming object-descriptive input data to distributed rendered location data in accordance with various embodiments.

FIG. 2 illustrates operation of a system 200 for consolidating and transforming object-descriptive input data to distributed rendered location data in accordance with a first example embodiment. As shown in FIG. 2, users provide object-descriptive input data via input devices 201*a-d*, which is transmitted to a datacenter 205 for consolidation, correlation with a plurality of physical objects, and redistribution to a plurality of user devices 203*a-d*. As shown, in the example embodiment of FIG. 2 the input devices 201*a-d* can double as user devices 203*a-d*. As shown in FIG. 2, each of the user devices 203*a-d* can be co-located at a single geographical location 207 (e.g., a retail store or warehouse). The datacenter 205 can consolidate the transmitted object-descriptive input data and correlate the consolidated object-descriptive input data with a plurality of physical objects. The datacenter 205 can redistribute subsets of the correlated plurality of physical objects amongst the user devices 203*a-d* along with a user device-specific graphical route map indicating a route for reaching each of the plurality of physical objects in the assigned subset(s). Each user can then traverse the mapped route associated with that user's user device 203*a-d*.

Figure 3:
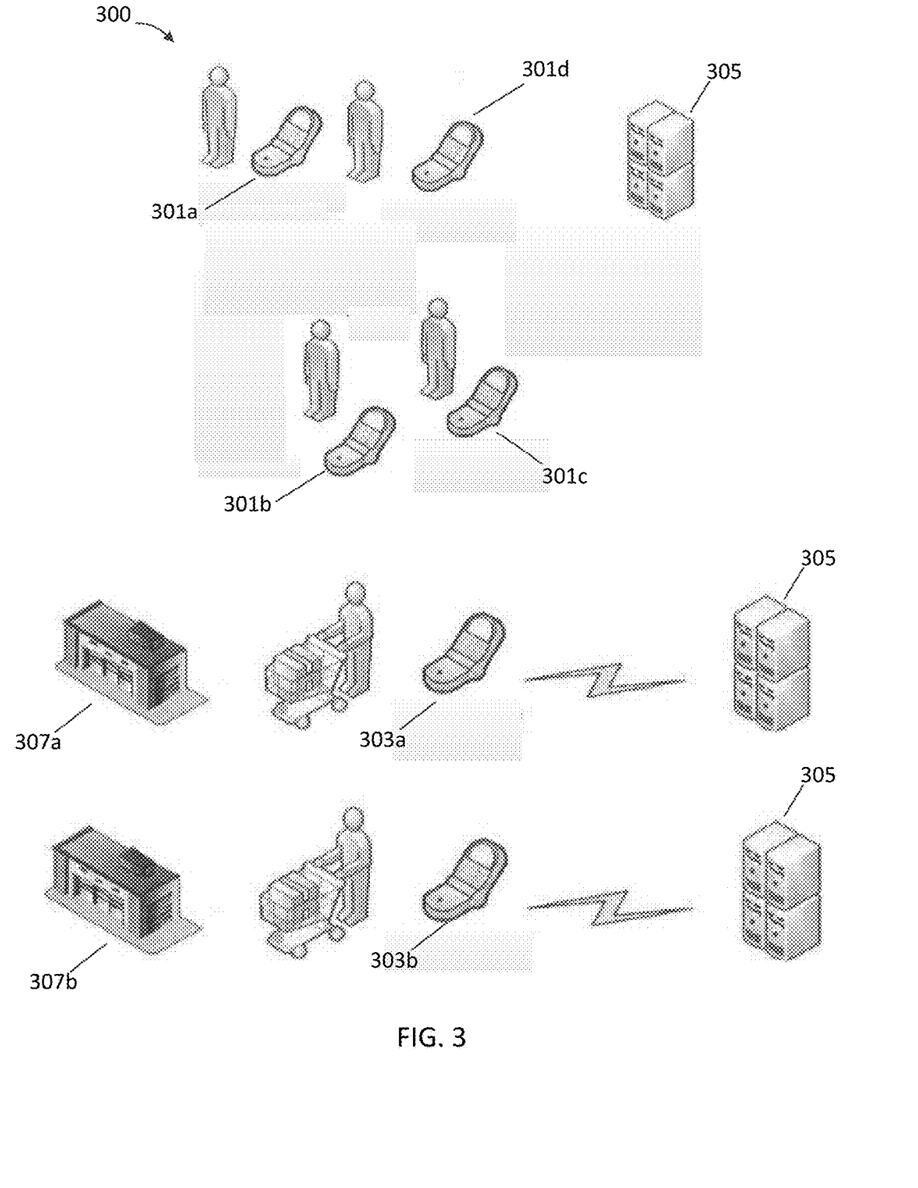
FIG. 3 is a functional flow diagram showing operation of an alternative system for consolidating and transforming object-descriptive input data to distributed rendered location data in accordance with various embodiments.

FIG. 3 illustrates operation of a system 300 for consolidating and transforming object-descriptive input data to distributed rendered location data in accordance with a second example embodiment. As shown in FIG. 3, users provide object-descriptive input data via input devices 301*a-d*, which is transmitted to a datacenter 305 for consolidation, correlation with a plurality of physical objects, and redistribution to a plurality of user devices 303*a*, 303*b*. As shown, in the example embodiment of FIG. 3, the input devices 301*a-d* are separate from the user devices 303*a*, 303*b*. As shown in FIG. 3, each of the user devices 303*a*, 303*b* can be located at separate geographical locations 307*a*, 307*b* (e.g., a retail store and a warehouse, two different retail stores, or two different warehouses). The datacenter 305 can consolidate the transmitted object-descriptive input data and correlate the consolidated object-descriptive input data with a plurality of physical objects. The datacenter 305 can redistribute subsets of the correlated plurality of physical objects amongst the user devices 303*a*, 303*b* along with a user device-specific graphical route map indicating a route for reaching each of the plurality of physical objects in the assigned subset(s). Each user can then traverse the mapped route associated with that user's user device 303*a*, 303*b* along a customized route specific to that user's geographical location 307*a*, 307*b*.

Figure 4:
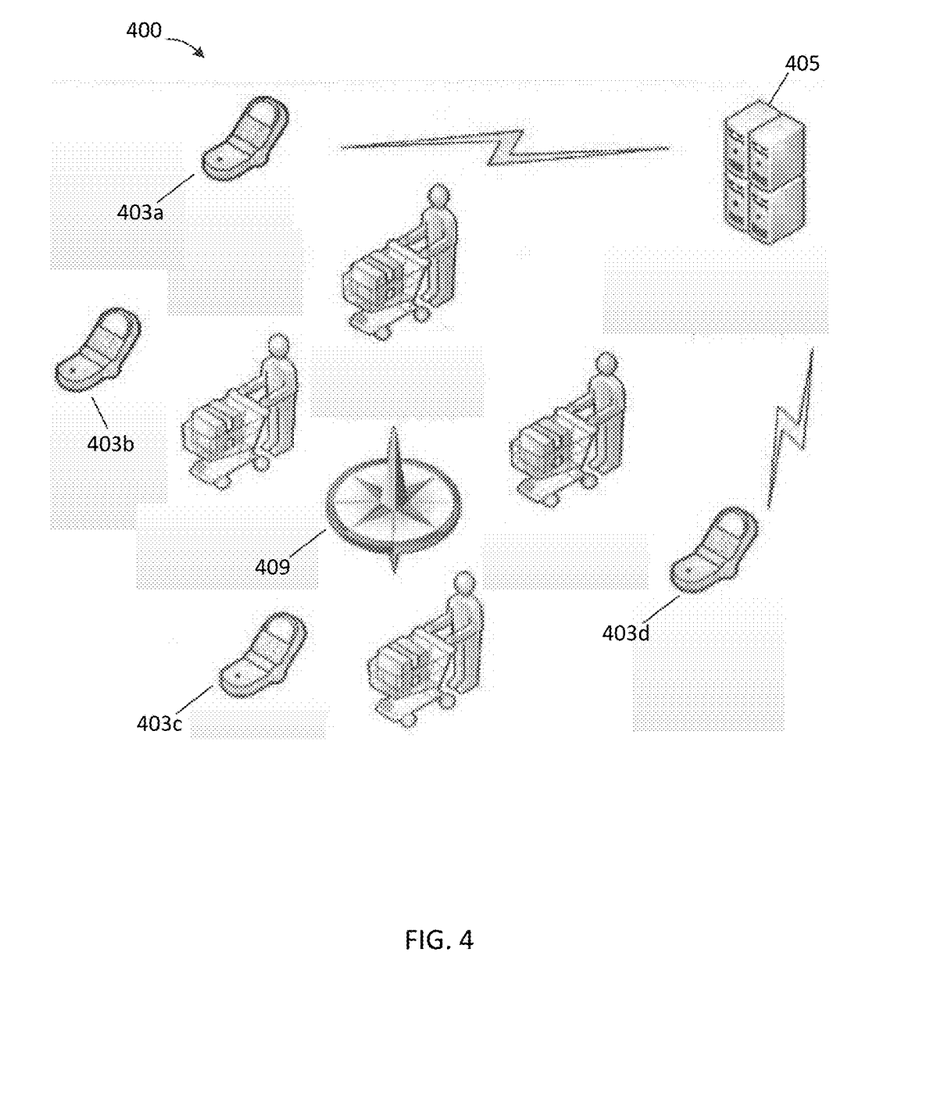
FIG. 4 is a functional flow diagram showing operation of a completion stage of a system for consolidating and transforming object-descriptive input data to distributed rendered location data in accordance with various embodiments.

As shown in FIG. 4, a system 400 for consolidating and transforming object-descriptive input data to distributed rendered location data, in accordance with various embodiments, is configured such that each route for each user device 403*a-d* can be constructed to have a common terminal end location 409 (e.g., a warehouse staging area, a retail store point of sale terminal, or any other designated location). Such configurations advantageously allow each user (or other party) to identify one or more of the plurality of objects as that party's responsibility with regard to further processing. For example, where the system 400 is used in a group shopping application, each group member can identify that member's items from the collectively acquired items. In accordance with various embodiments, peripheral features of the user device(s) 403*a-d* (e.g., cameras or RFID scanning functionality) can be used to identify each item intended for a user associated with the user device 403*a-d*, which information can be relayed by each user device 403*a-d* to the datacenter 405 for confirmation and consolidation for checkout.

Figure 5:
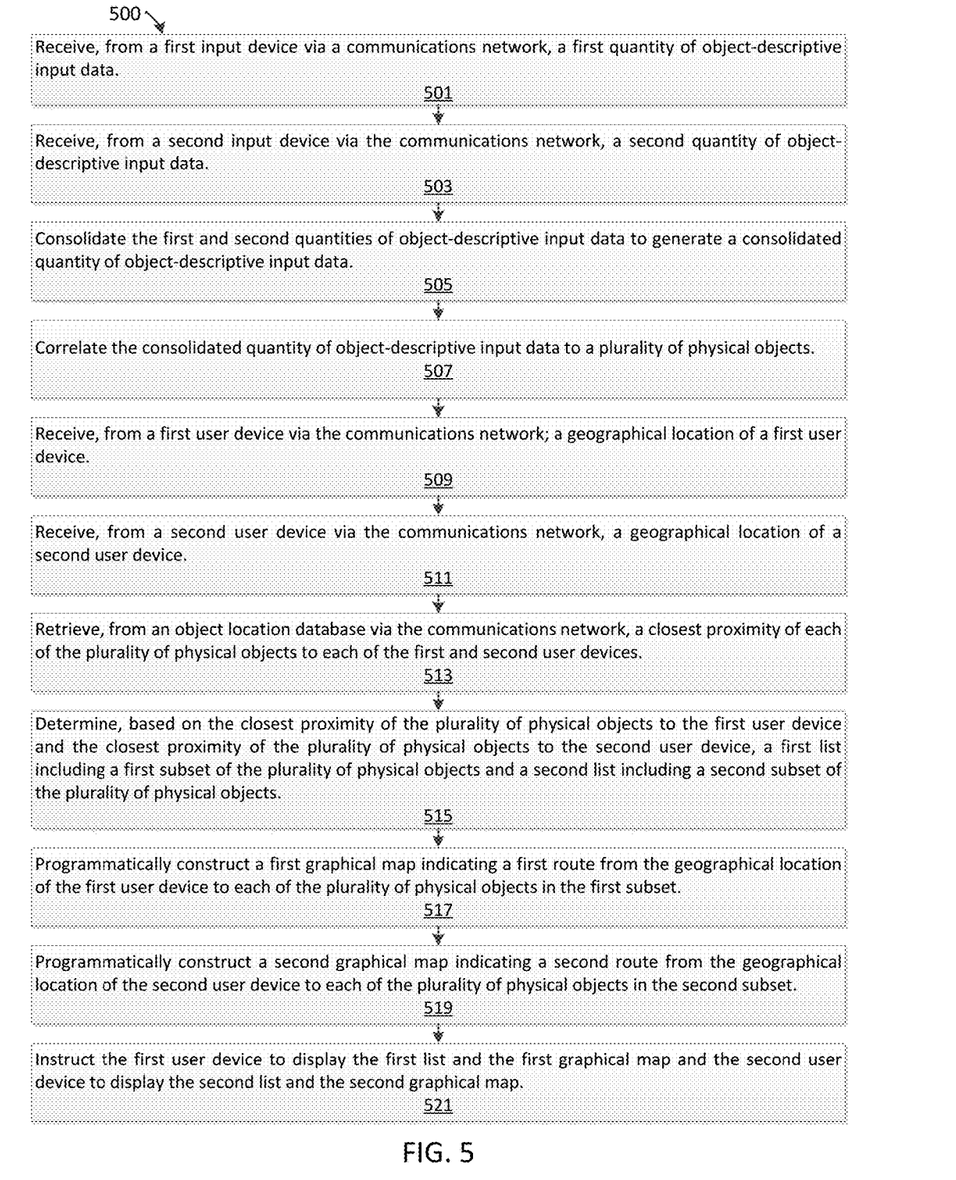
FIG. 5 is a flow diagram illustrating an example method for consolidating and transforming object-descriptive input data to distributed rendered location data in accordance with various embodiments.

Referring now to FIG. 5, a method is provided for consolidating and transforming object-descriptive input data to distributed rendered location data. The method includes the step of receiving, from a first input device via a communications network, a first quantity of object-descriptive input data 501. The method also includes the step of receiving, from a second input device via the communications network, a second quantity of object-descriptive input data 503. The method also includes the step of consolidating the first and second quantities of object-descriptive input data to generate a consolidated quantity of object-descriptive, input data 505. The method also includes the step of correlating, in a consolidation database, the consolidated quantity of object-descriptive input data to a plurality of physical objects 507. The method also includes the step of receiving, from a first user device via the communications network, a geographical location of a first user device 509. The method also includes the step of receiving, from a second user device via the communications network, a geographical location of a second user device 511. The method also includes the step of retrieving, from an object location database via the communications network, a closest proximity of each of the plurality of physical objects to each of the first and second user devices 513.

The method also includes the step of determining, based on the closest proximity of the plurality of physical objects to the first user device and the closest proximity of the plurality of physical objects to the second user device, a first list including a first subset of the plurality of physical objects and as second list including a second subset of the plurality of physical objects 515. The method also includes the step of programmatically constructing a first graphical map indicating a first route from the geographical location of the first user device to each of the plurality of physical objects in the first subset 517. The method also includes the step of programmatically constructing a second graphical map indicating a second route from the geographical location of the second user device to each of the plurality of physical objects in the second subset 519. The method also includes the step of instructing the first user device to display the first list and the first graphical map and the second user device to display the second list and the second graphical map 521.

The steps of receiving, from a first input device via a communications network, a first quantity of object-descriptive input data 501 and receiving, from a second input device via the communications network, a second quantity of object-descriptive input data 503 can be performed, for example but not limited to, using the input devices 101a-b, 201a-d, 301a-d and communication devices 111 as described above with reference to FIGS. 1-3.

The step of consolidating the first and second quantities of object-descriptive input data to generate a consolidated quantity of object-descriptive input data 505 can be performed, for example but not limited to, using the processor 109 and memory 107 of the datacenter 105, 205, 305, 405 as described above with reference to FIGS. 1-4.

The step of correlating, in a consolidation database, the consolidated quantity of object-descriptive input data to a plurality of physical objects 507 can be performed, for example but not limited to, using the processor 109 and memory 107 of the datacenter 105, 205, 305, 405 as described above with reference to FIGS. 1-4.

The step of receiving, from a first user device via the communications network; a geographical location of a first user device 509 and the step of receiving, from a second user device via the communications network, a geographical location of a second user device 511 can be performed using the user devices 103a-b, 203a-d, 303a-b, 403a-d and communication devices 111 as described above with reference to FIGS. 1-4.

The step of retrieving, from an object location database via the communications network, a closest proximity of each of the plurality of physical objects to each of the first and second user devices 513 can be performed, for example but not limited to, using the processor 109 and memory 107 of the datacenter 105, 205, 305, 405 and the object location database 113 as described above with reference to FIGS. 1-4.

The step of determining, based on the closest proximity of the plurality of physical objects to the first user device and the closest proximity of the plurality of physical objects to the second user device, a first list including a first subset of the plurality of physical objects and a second list including a second subset of the plurality of physical objects 515 can be performed, for example but not limited to, using the processor 109 and memory 107 of the datacenter 105, 205, 305, 405 as described above with reference to FIGS. 1-4.

The step of programmatically constructing a first graphical map indicating a first route from the geographical location of the first user device to each of the plurality of physical objects in the first subset 517 and the step of programmatically constructing a second graphical map indicating a second route from the geographical location of the second user device to each of the plurality of physical objects in the second subset 519 can be performed, for example but not limited to, using the processor 109 and memory 107 of the datacenter 105, 205, 305, 405 and the object location database 113 as described above with reference to FIGS. 1-4.

The step of instructing the first user device to display the first list and the first graphical map and the second user device to display the second list and the second graphical map 521 can be performed, for example but not limited to, using the processor 109 and memory 107 of the datacenter 105, 205, 305, 405 and the object location database 113 as described above with reference to FIGS. 1-4.

Non-Limiting Example of a Group Shopping Application Embodiment

A system 100, 200, 300, 400 for consolidating and transforming object-descriptive input data to distributed rendered location data, in accordance with various embodiments, can be used for facilitating coordinated shopping among members of a group. Such systems 100, 200, 300, 400, 500 may include a mobile application loaded on a plurality of user devices (e.g., 103a-b, 203a-d, 303a-d). Users may be members of a group based on affinity such as a business, family, church, or simply a group of individuals simply having shared shopping needs.

In general, a mobile application ("app") may be used to allow users to form groups by creating shopping lists and then sharing those lists with other users to facilitate shopping for and/or by the group. While the groups are defined by those users sharing a shopping list, these groups will typically correspond to some affinity group such as families, business associates, church organizations, and other groups.

Operation of the system 100, 200, 300, 400 may include registering a plurality of users. Registration may generally include creating user accounts through the app or a website and result in the creation of a unique username and password. A shopping list may be generated in response to selections made by one or more users at an input device 101a-b, 201a-d, 301a-d. The selections may be made by selecting items from an online store, scanning UPC codes, or other means. In some embodiments, multiple users may submit or select items to be purchased. These individual lists may be combined and assembled into a master list. The master list may then be partitioned into subsets as described herein.

At least a portion of the list may be shared with at least one other user. Sharing may be accomplished by pushing list portions (i.e. subsets of the list) to the other user's device in response to a request from the list creator or entry of a code corresponding to the list by the user with whom the list is to be shared. Sharing may also be accomplished by way of providing a token from one user device to another via Wi-Fi, Bluetooth, MMS, SMS, or other means. The token may then be used by the user device to obtain a list, or portion thereof, from a datacenter 105, 205, 305, 405.

The partitioning of the portions (i.e., subsets) of the list to be shared may be done based on a variety of factors. These may include product price, weight, size, availability at one or more store locations, the location of a listed product within a store (i.e. shelf position), and the position of one or more of the users within the store.

In some embodiments the lists may be edited by only the user who created the list. In other embodiments varying levels of editing rights may be granted to other users. Users may be allowed to add items to a list that will not be made visible to the other users with whom the greater list is shared allowing for tracking of personal, non-group items. In embodiments where list partitioning is based, at least in part, on the location of items within a store, the location of the user in the store, and/or the availability of items of at one or more store locations, a shopper route may be provided to optimize the shopping experience. In some of these embodiments, the list may be partitioned upon arrival of one or more users at a store. The items assigned to a particular shopper may be selected based on which store location the shopper is at, such that only in-stock items at that store are assigned to the user. In the case where multiple users are at the same store location, each may be provided with lists based on the locations of items within the store such that each is provided with an efficient route to take each user to the shelf location of the assigned items. Partitioning may also be done taking into account the size, weight, and cost of the items on the greater list to more evenly distribute items among the plurality of users. The app may present the users each with a unique store map including a route to follow. The users may "check off" items from the list by selecting them in the app or scanning them with the device's camera.

In some such embodiments, a push notification may be issued to a user who passes an item on their route without checking it off their list. Additionally (or alternatively) a notification may be provided to the user as they approach an item on their list as they progress along their route.

In some embodiments, each user's sub-list may dynamically update as the group progresses through the shopping process. As users check off items, the routes and sub-lists may be recalculated to optimize shopping and result in the plurality of users all completing retrieval of the items assigned to them such that they finish at roughly the same time. In some embodiments, the users may be at different store locations. In these cases, multiple sub-lists may be dynamically updated as the users progress through their sub-lists.

In some embodiments, in particular where multiple users are at the same store location, the app may display the location of the each user to the others on the store map. A "Rendezvous" button may be provided in the app by which each user may request a meet up of all the users sharing a particular list. When the Rendezvous feature is activated, the app may select a point in the store for the users to go to. The point may be determined by calculating a center-of-gravity or average position of the shoppers. The point may also be selected based on a limited number of suitable positions in the store. Such positions would be in areas of low traffic and congestion to minimize disruption to other shoppers.

The system may work cooperatively with a store system allowing "scan and go" shopping whereby items are tallied as a user scans them and charged upon exit. The total charged may be paid by a single user or divided evenly among the plurality of users. Alternatively each user may pay for the items that user has scanned. The app may have a calendar integration feature whereby the plurality of users can share calendar information and facilitate the scheduling of group shopping. Text chatting, push-to-talk, and other communication features may be provided that automatically share communications with the members of the user group present at a store location while. Group members may also be allowed to make comments on list items to indicate possible substitutions or other information that may be useful to another user to whom the item is assigned.

The app may also be provided with an advertising function where products not on the list can be recommended to one or more of the users. The recommendations may be based on the individual users items added to the master list, the items assigned to the user, or the location of the user in the store.

In some embodiments users may be supplying a list of items needed for themselves or their household that will be retrieved from the other users after shopping. In such cases each user may be responsible for the cost of the items on their submitted list. A budgeting feature may be provided such that each user can set a spending cap for their items. This may be implemented to limit the items for the applicable list assigned to the users. A report may be generated and sent via the app, email, text, or otherwise to provide each user a list of the items they selected that were actually purchased. Group budgets may also be provided for the total list and allow for the aggregate cost to be tracked as the group shops.

Non-Limiting Example Computing Devices

Figure 6:
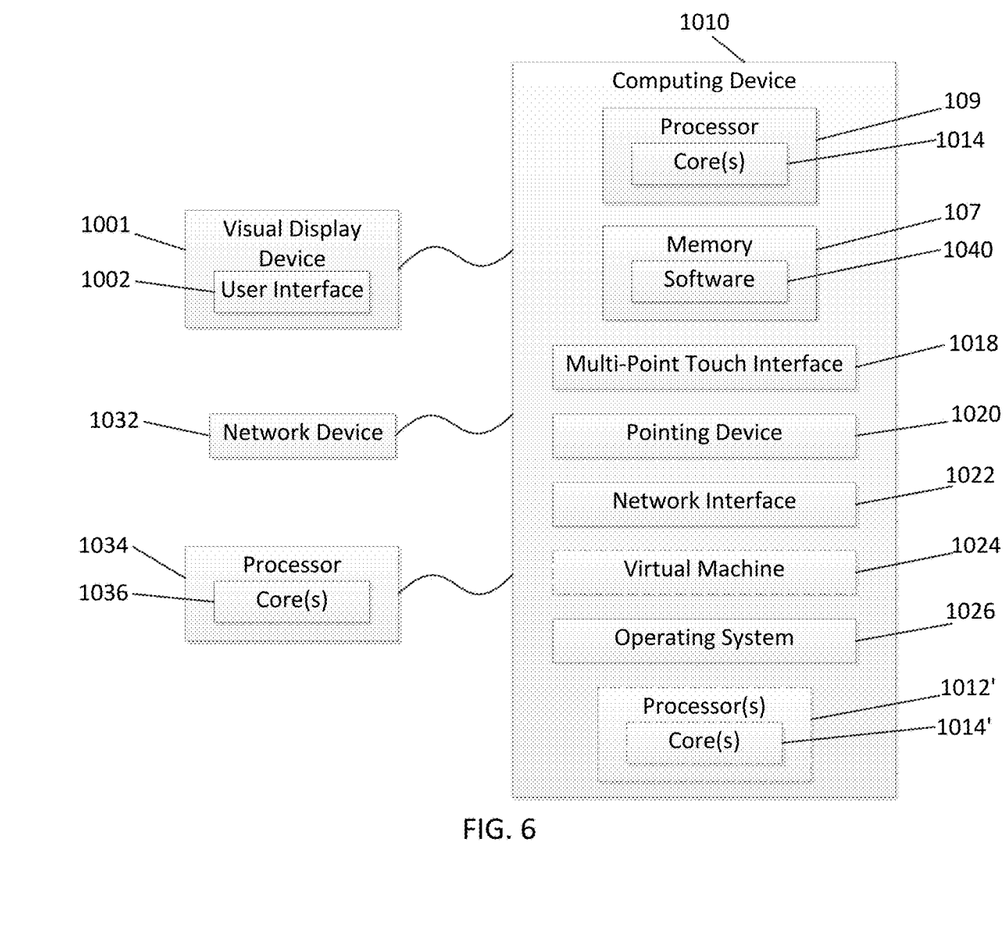
FIG. 6 is an example computational device block diagram depicting various components that can be used to implement various of the disclosed embodiments.

FIG. 6 is a block diagram of an exemplary computing device 1010 such as can be used, or portions thereof, in accordance with various embodiments as described above with reference to FIGS. 1-5. The computing device 1010 includes one or more non-transitory computer readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 107 included in the computing device 1010 can store computer-readable and computer-executable instructions or software for performing the operations disclosed herein. For example, the memory can store software application 1040 which is programmed to perform various of the disclosed operations as discussed with respect to FIGS. 1-5. The computing device 1010 can also include configurable and/or programmable processor 109 and associated core 1014, and optionally, one or more additional configurable and/or programmable processing devices, e.g., processor(s) 1012' and associated core(s) 1014' (for example, in the case of computational devices having multiple processors/cores), for executing computer-readable and computer-executable instructions or software stored in the memory 107 and other programs for controlling system hardware. Processor 109 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 107 can include a computational device memory or random access memory, such as but not limited to DRAM, SRAM, EDO RAM, and the like. Memory 107 can include other types of memory as well, or combinations thereof.

A user can interact with the computing device 1010 through a visual display device 1001, 111A-D, such as a computer monitor, which can display one or more user interfaces 1002 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1002. The computing device 1010 can include other suitable conventional I/O peripherals.

The computing device 1010 can also include one or more storage devices 1034, such as but not limited to a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the Versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 7:
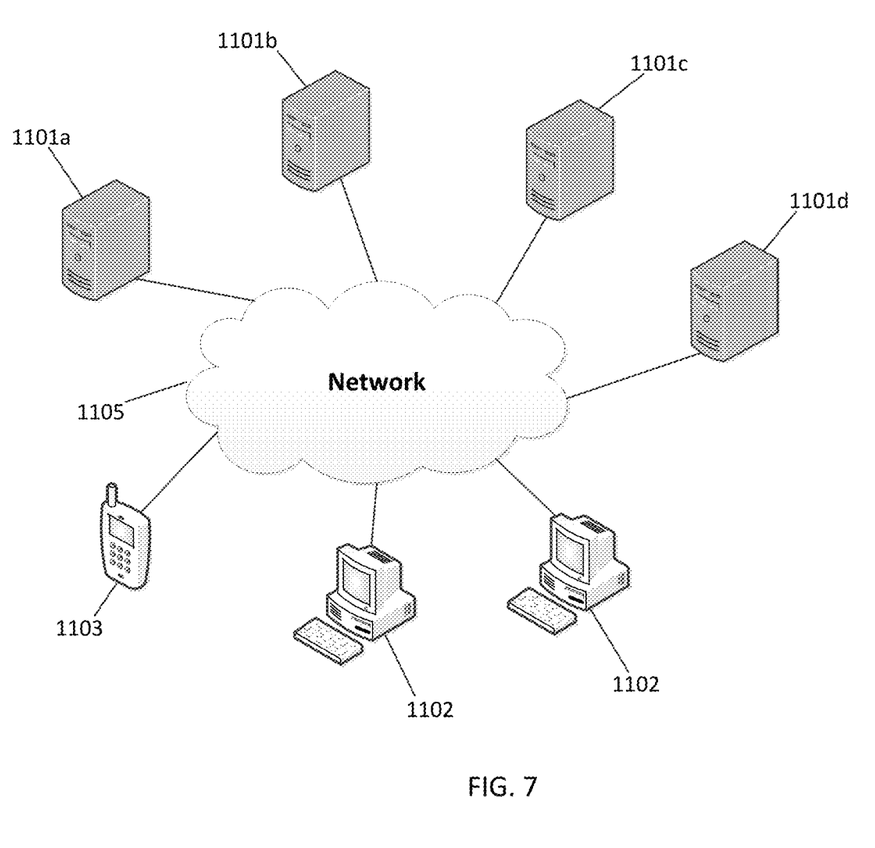
FIG. 7 is an example computational device block diagram depicting various components that can be used to implement various of the disclosed embodiments in a distributed system.

FIG. 7 is an example computational device block diagram of certain distributed embodiments. Although FIGS. 1-4, and portions of the exemplary discussion above, make reference to a centralized datacenter 105 operating on a single computing device, one will recognize that various of the modules within the datacenter 105 may instead be distributed across a network 1105 in separate server systems 1101a-d and possibly in user systems, such as kiosks, desktop computer devices 1102, or mobile computer devices 1103. For example, the datacenter 105 may be implemented across a cloud computing network. In some distributed systems, the modules of the alert system 100 can be separately located on server systems 1101a-d and can be in communication with one another across the network 1105.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for consolidating and transforming object-descriptive input data to distributed rendered location data, the method comprising:

receiving, from a first input device via a communications network, a first quantity of object-descriptive input data;

receiving, from a second input device via the communications network, a second quantity of object-descriptive input data;

consolidating the first and second quantities of object-descriptive input data to generate a consolidated quantity of object-descriptive input data;

correlating the consolidated quantity of object-descriptive input data to a plurality of physical objects located within a single geographical location;

receiving, from a first user device via the communications network, a geographical location of a first user device located within the single geographical location;

receiving, from a second user device via the communications network, a geographical location of a second user device located within the single geographical location;

retrieving, from an object location database via the communications network, a closest proximity of each physical object of the plurality of physical objects to each of the first and second user devices;

determining, based on the closest proximity of each physical object of the plurality of physical objects to the first user device and the closest proximity of each physical object of the plurality of physical objects to the second user device, a first list including a first subset of the plurality of physical objects and a second list including a second subset of the plurality of physical objects;

programmatically constructing a first graphical map of the single geographical location indicating a first route from the geographical location of the first user device to each physical object of the plurality of physical objects in the first subset;

programmatically constructing a second graphical map of the single geographical location indicating a second route from the geographical location of the second user device to each physical object of the plurality of physical objects in the second subset;

instructing the first user device to display the first list including the first subset of the plurality of physical objects located within the single geographical location and the first graphical map of the single geographical location; and instructing the second user device to display the second list including the second subset of the plurality of physical objects located within the single geographical location and the second graphical map of the single geographical location.

2. The method of claim 1, wherein the first route and the second route are configured to minimize a combined distance required for the first user device and the second user device to reach each of the plurality of physical objects.

3. The method of claim 1, wherein the first route and the second route are configured to minimize a combined traversal time required for the first user device and the second user device to reach each of the plurality of physical objects.

4. The method of claim 1, further comprising:
receiving, from at least one additional input device via the communications network, at least one additional quantity of object-descriptive input data;
consolidating the at least one additional quantity of object-descriptive input data with the first and second quantities of object-descriptive input data to generate the consolidated quantity of object-descriptive input data;
receiving, from at least one additional user device via the communications network, a geographical location of the at least one additional user device located within the single geographical location;
retrieving, from an object location database via the communications network, a closest proximity of each physical object of the plurality of physical objects to the at least one additional user device;
determining, based on the closest proximity of each physical object of the plurality of physical objects to the at least one additional user device, at least one additional list including at least one additional subset of the plurality of physical objects;
programmatically constructing at least one additional graphical map of the single geographical location indicating at least one additional route from the geographical location of the at least one additional user device to each of the plurality of physical objects in the at least one additional subset; and
instructing the at least one additional user device to display the at least one additional list and the at least one additional graphical map of the single geographical location.

5. The method of claim 4, wherein the first route, the second route, and the at least one additional route are configured to minimize a combined distance required for the first user device, the second user device, and the at least one additional user device to reach each of the plurality of physical objects.

6. The method of claim 4, wherein the first route, the second route, and the at least one additional route are configured to minimize a combined traversal time required for the first user device, the second user device, and the at least one additional user device to reach each of the plurality of physical objects.

7. A system for consolidating and transforming object-descriptive input data to distributed rendered location data, the system comprising:
a first input device configured to transmit a first quantity of object-descriptive input data to a datacenter via a communications network;
a second input device configured to transmit a second quantity of object-descriptive input data to the datacenter via the communications network;
a first user device located within a single geographical location configured to transmit a geographical location of the first user device to the datacenter via the communications network;
a second user device located within the single geographical location configured to transmit a geographical location of the second user device to the datacenter via the communications network; and
the datacenter including instructions stored in a memory that when executed by a processor:
consolidate, the first and second quantities of object-descriptive input data to generate a consolidated quantity of object-descriptive input data,
correlate the consolidated quantity of object-descriptive input data to a plurality of physical objects located within the single geographical location,
retrieve, from an object location database, a closest proximity of each physical object of the plurality of physical objects to each of the first and second user devices,
determine, based on the closest proximity of each physical object of the plurality of physical objects to the first user device and the closest proximity of each physical object of the plurality of physical objects to the second user device, a first list including a first subset of the plurality of physical objects and a second list including a second subset of the plurality of physical objects,
programmatically construct a first graphical map of the single geographical location indicating a first route from the geographical location of the first user device to each physically object of the plurality of physical objects in the first subset,
programmatically construct a second graphical map of the single geographical location indicating a second route from the geographical location of the second user device to each physical object of the plurality of physical objects in the second subset,
instruct the first user device to display the first list including the first subset of the plurality of physical objects located within the single geographical location and the first graphical map of the single geographical location, and
instruct the second user device to display the second list including the second subset of the plurality of physical objects located within the single geographical location and the second graphical map of the single geographical location.

8. The system of claim 7, wherein the first route and the second route are configured to minimize a combined distance required for the first user device and the second user device to reach each of the plurality of physical objects.

9. The system of claim 7, wherein the first route and the second route are configured to minimize a combined traversal time required for the first user device and the second user device to reach each of the plurality of physical objects.

10. The system of claim 7, further comprising:
at least one additional input device configured to transmit at least one additional quantity of object-descriptive input data to the datacenter via the communications network;
at least one additional user device located within the single geographical location and configured to transmit a geographical location of the at least one additional user device to the datacenter via the communications network; and further instructions stored in the memory of the datacenter that when executed by a processor:
   retrieve, from an object location database via the communications network, a closest proximity of each physical object of the plurality of physical objects to the at least one additional user device,
   determine, based on the closest proximity of each physical object of the plurality of physical objects to the at least one additional user device, at least one additional list including at least one additional subset of the plurality of physical objects,
   programmatically construct at least one additional graphical map of the single geographical location indicating at least one additional route from the geographical location of the at least one additional user device to each of the plurality of physical objects in the at least one additional subset, and
   instruct the at least one additional user device to display the at least one additional list and the at least one additional graphical map of the single geographical location.

11. The system of claim 10, wherein the first route, the second route, and the at least one additional route are configured to minimize a combined distance required for the first user device the second user device, and the at least one additional user device to reach each of the plurality of physical objects.

12. The system of claim 10, wherein the first route, the second route, and the at least one additional route are configured to minimize a combined traversal time required for the first user device, the second user device, and the at least one additional user device to reach each physical object of the plurality of physical objects.

13. The system of claim 7, wherein the first input device is at least one of integrated within or separate from the first user device.

14. The system of claim 7, wherein the second input device is at least one of integrated within or separate from the second user device.

15. The system of claim 7, wherein at least one of the first user device and the second user device is a mobile device.

16. The system of claim 7, wherein the geographical location of the first user device and the second user device is at least one of a retail store or a warehouse.

17. The system of claim 16, wherein the plurality of physical objects includes a plurality of items stocked at the geographical location of the first user device.

18. The system of claim 17, wherein the first graphical map indicates an interior stock location of each of the plurality of products in the first subset.

19. The system of claim 7, wherein the geographical location of the first user device is the same as the geographical location of the second user device and wherein the first route and the second route include a common terminal endpoint.

* * * * *